United States Patent
Chiou et al.

[11] Patent Number: 5,944,410
[45] Date of Patent: Aug. 31, 1999

[54] STRUCTURE OF A LASER INDICATOR

[75] Inventors: Wen-Bin Chiou; Chung-Cheng Lin; Kuo-Fu Hsu; Rong-Yih Hwang; Tzer-Perng Chen, all of Taipei, Taiwan

[73] Assignee: Excellence Optoelectronics Inc., Hsinchu, Taiwan

[21] Appl. No.: 09/122,886

[22] Filed: Jul. 28, 1998

[51] Int. Cl.[6] .................................................. F21K 7/00
[52] U.S. Cl. .......................... 362/259; 362/109; 362/188
[58] Field of Search ..................................... 362/109, 118, 362/188, 259, 253

[56] References Cited

U.S. PATENT DOCUMENTS 5,584,569  12/1996  Huang ................................. 362/259 X
5,697,700  12/1997  Huang ..................................... 362/259

Primary Examiner—Stephen Husar
Attorney, Agent, or Firm—A & J

[57] ABSTRACT

An improved structure of a laser indicator includes an outer tube, a cover cap, a focus adjusting device, an optical lens, and a circuit board having a laser diode disposed thereon. The outer tube and the cover cap are joined to form a rod-shaped indicator housing. The optical lens and the laser diode are provided inside the focus adjusting device, which is comprised of an inner cover and an outer cover working in conjunction with a metallic spring. The laser diode is fittingly disposed inside the inner cover, while the outer cover is screwably connected to the outer cover. The spring is disposed between the inner cover and the optical lens. One end of the outer cover is screwably coupled to the cover cap, while the other end thereof forms a smooth holding surface to facilitate turning of the outer cover in focus adjustment. The arrangement of the spring ensures the positioning of the optical lens and forms a bridge for the conduction of electric currents between the outer and inner covers, thereby avoiding the problem that the inner cover is isolated from the outer tube after it is coated with a fixing glue.

1 Claim, 2 Drawing Sheets

STRUCTURE OF A LASER INDICATOR

BACKGROUND OF THE INVENTION

1. Field of the Invention

The present invention generally relates to an improved structure of a laser indicator, and more particularly to a focus adjusting mechanism inside the laser indicator.

2. Description of the Prior Art

In general, during manufacturing or assembly of laser indicators, the focal distance between the light source and the optical lens has to be adjusted so that the emitted laser beam may reach its optimal linearity before application of a fixing glue. However, conventional focus adjusting mechanisms are either too complicated and inconvenient or too simple and imprecise.

SUMMARY OF THE INVENTION

The present invention generally relates to an improved structure of a laser indicator, and more particularly to a focus adjusting mechanism inside the laser indicator.

A primary object of the present invention is to provide an improved structure of a laser indicator.

According to the present invention, a focus adjusting device is comprised of an inner cover and an outer cover screwably connected. The inner cover has a laser diode fittingly disposed therein. An optical lens is disposed in the outer cover. The inner cover is screwably connected to inside the outer cover, and a metallic spring is disposed between the optical lens and the inner cover. During adjustment of focus, the inner cover may be held while the outer cover is turned, which facilitates and simplifies the adjustment work. Besides, the spring is provided to urge against the optical lens to keep it in position after focus adjustment, and the spring is designed to contact both the inner cover and the outer cover so that it forms a bridge for the conduction of electric currents between the inner and outer covers, thereby avoiding the problem that the inner cover is isolated from the outer tube after it is coated with a fixing glue after focus adjustment.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
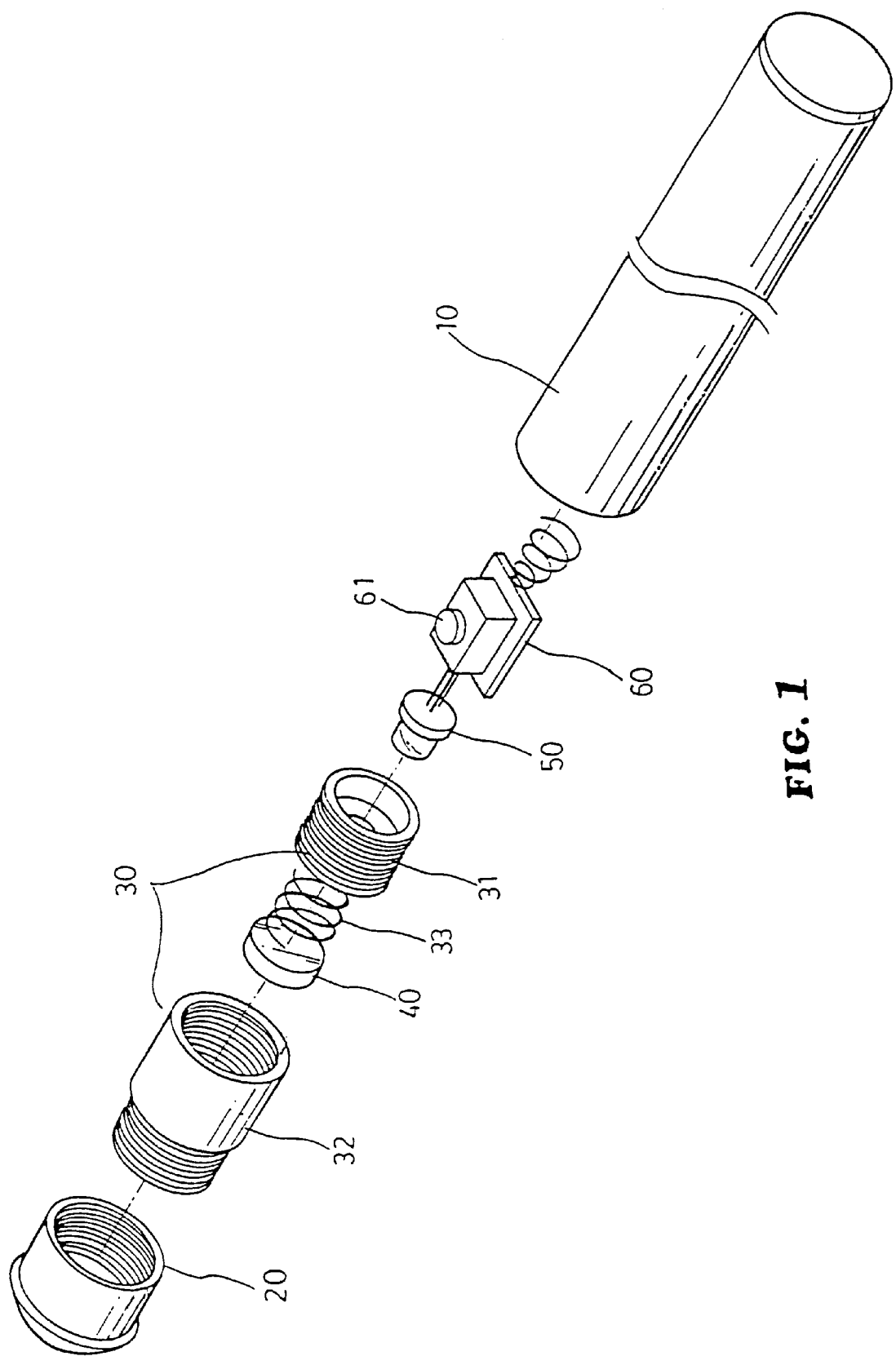
FIG. 1 is a schematic exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
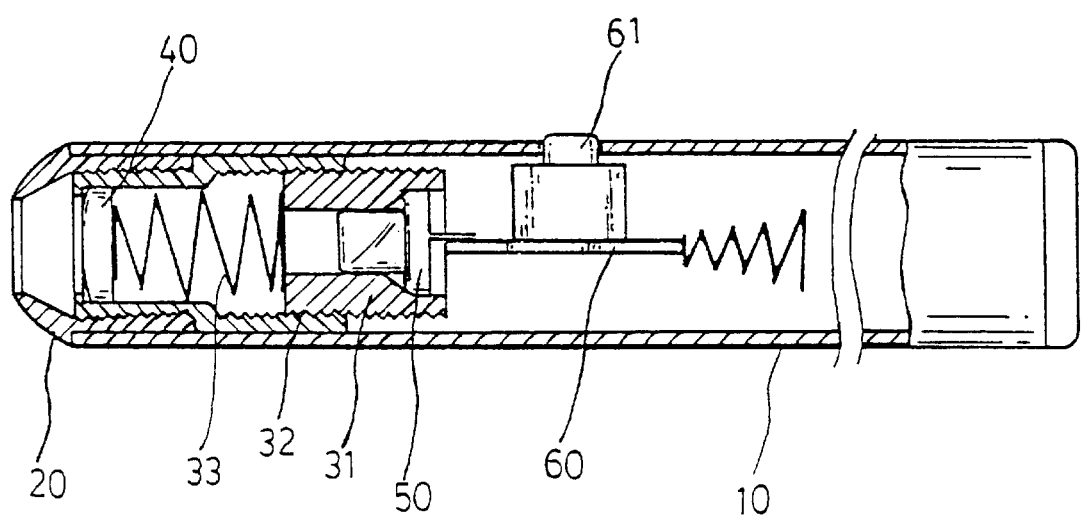
FIG. 2 is a schematic sectional assembled view of the present invention.

With reference to FIGS. 1 and 2, the present invention essentially comprises an outer tube 10, a cover cap 20, a focus adjusting device 30, an optical lens 40, a laser diode 50, and a circuit board 60. The outer tube 10 and the cover cap 20 are tightly fitted to form a housing of the laser indicator of the present invention. The focus adjusting device 30 is housed inside the outer tube 10 and screwably secured to the cover cap 20. The focus adjusting device 30 includes an inner cover 31, an outer cover 32, and a spring 33. The outer cover 32 is provided with external threads at one end to screwably engage the cover cap 20, and a smooth surface at the other end. The interior of the outer cover 32 defines a hollow receiving recess 321 which has an outlet end internally provided with a flange against which the optical lens 40 may urge when placed inside the outer cover 32. The other end of the recess 321 is provided with internal threads. The outer surface of the inner cover 31 is provided with threads, while the interior thereof forms a hollow stepped receiving space 311 into which the laser diode 50 may be fittingly placed. The arrangement of the stepped receiving space 311 is to ensure that the laser diode 50 is tightly and fittingly received and that it has good radiating effects. The inner cover 31 is screwably received in the recess 321 of the outer cover 32 relative to the outlet end of the optical lens 40. The spring 33 is disposed inside the recess 321 of the outer cover 32 such that one end thereof abuts the optical lens 40 while the other end thereof urges against the inner cover 31. The spring 33 may be a conventional coil spring or a stepped or conical spring capable of contacting the inner wall of the outer cover 32 simultaneously. One end of the laser diode 50 is electrically connected to the circuit board 60, which is in turn connected to a power supply (not shown). The circuit board 60 has a switch 61 provided thereon to control the "ON" and "OFF" of the circuit. Finally, the outer tube 10 is fitted in place to achieve the assembly of the present invention.

Referring to FIG. 2, which is a sectional assembled view of the present invention, prior to completion of assembly, the light source and the focus of the optical lens has to be adjusted in advance to ensure that the linearity of the laser light beam emitted. The manner of adjustment is to turn the outer cover 32 of the focus adjusting device 30 to change the distance between the laser diode 50 and the optical lens 40. An advantage of the present invention is that the focus adjusting device 30 is comprised of separable inner and outer covers. Besides, since the outer cover 32 has a smooth surface, it facilitates holding of the outer cover 32 during micro-adjustment of focus. Furthermore, the arrangement of the spring 33 ensures the positioning of the optical lens 40, which is hence prevented from displacement due to turning of the outer cover 32. Besides, since it urges against the inner cover 31, the threads of the inner and outer covers 31 and 32 can be tightly coupled without loosening, thus ensuring the precision of micro-adjustment. At the same time, the spring 33 is designed to be in contact with both the metallic surfaces of the inner and outer covers 31 and 32. In this way, after the inner cover 31 is coated with a glues the glue will not penetrate into the coupled threaded surfaces of the inner and outer covers 31 and 32, causing the inner and outer covers 31 and 32 to become isolated, thus leading to the opening of the circuit. Since the electrical connection of the battery circuit is through the circuit board and the outer tube, and the outer tube and the cover cap must pass the outer and inner covers to the circuit board to form a path, if the outer and inner covers become isolated, the path will be blocked and the circuit will become opened.

In summary, the improved structure of the laser indicator according to the present invention is directed to the configuration of the focus adjusting device, which may positively enhance the precision and facility of focus adjustment. Besides, the problem of opening the circuit due to glue coating may be avoided.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A laser indicator comprising: an outer tube, a cover cap, a focus adjusting device, an optical lens, and a circuit board having a laser diode coupled thereto, said focus adjusting device being screwably connected to said cover cap, said optical lens and said laser diode being received in said focus adjusting device fitted into said outer tube, which is coupled to said cover cap to form a rod-shaped housing, wherein said focus adjusting device includes separable inner cover and outer cover screwably connected together, said outer cover being externally provided with threads at one end thereof to be screwably connected with said cover cap, and having a smooth surface at the other end thereof, said outer cover having an interior defining a hollow recess, said optical lens being disposed at one end of said recess while said inner cover being screwably connected to the other end of said recess, a metallic spring being disposed intermediate said optical lens and said inner cover, said inner cover having an interior forming a stepped receiving space in which said laser diode is fittingly disposed, said laser diode being electrically connected to said circuit board, whereby said focus adjusting device ensures precise and convenient focus adjustment and said spring is designed to be a bridge for the conduction of electric currents between said inner cover and said outer cover, thus avoiding the problem that said inner cover becomes isolated from said outer tube when said inner cover is coated with a fixing glue after focusing.

\* \* \* \* \*